(12) United States Patent
Turley

(10) Patent No.: US 7,147,771 B2
(45) Date of Patent: Dec. 12, 2006

(54) EFFLUENT TREATMENT SYSTEM

(75) Inventor: Timothy L. Turley, Sedalia, MO (US)

(73) Assignee: Graywater Return, LLC, Warrensburg, MO (US)

( * ) Notice: Subject to any disclaimer, the term of this patent is extended or adjusted under 35 U.S.C. 154(b) by 0 days.

(21) Appl. No.: 11/130,802

(22) Filed: May 16, 2005

(65) Prior Publication Data
US 2006/0254965 A1     Nov. 16, 2006

(51) Int. Cl.
*B01D 33/00* (2006.01)
(52) U.S. Cl. .................................................... 210/196
(58) Field of Classification Search ......... 210/194–197
See application file for complete search history.

(56) References Cited

U.S. PATENT DOCUMENTS

| | | | |
|---|---|---|---|
| 4,793,934 A * | 12/1988 | Thompson et al. ......... | 210/715 |
| 4,824,563 A | 4/1989 | Iwahori et al. | |
| 5,106,493 A | 4/1992 | McIntosh | |
| 5,114,586 A | 5/1992 | Humphrey | |
| 5,254,253 A | 10/1993 | Behmann | |
| 5,480,561 A * | 1/1996 | Ball et al. .................... | 210/744 |
| 5,647,980 A | 7/1997 | Smith et al. | |
| 5,647,986 A | 7/1997 | Nawathe et al. | |
| 5,667,670 A | 9/1997 | Drewery | |
| 6,051,892 A * | 4/2000 | Toal, Sr. ...................... | 290/43 |
| 6,106,716 A | 8/2000 | Berkman | |
| 6,299,775 B1 | 10/2001 | Elston | |
| 6,372,137 B1 * | 4/2002 | Bounds ...................... | 210/605 |
| 6,383,369 B1 | 5/2002 | Elston | |
| 6,638,420 B1 * | 10/2003 | Tyllila ......................... | 210/86 |
| 6,858,142 B1 * | 2/2005 | Towndrow .................. | 210/602 |
| 2002/0008065 A1 | 1/2002 | Elston | |
| 2003/0217954 A1 * | 11/2003 | Towndrow ................... | 210/97 |

\* cited by examiner

Primary Examiner—Chester T. Barry
(74) Attorney, Agent, or Firm—Walker, McKenzie & Walker, P.C.

(57) ABSTRACT

An effluent treatment system including a treatment tank for holding effluent; a filter for filtering effluent from the treatment tank; a valve for directing effluent from the filter component to either a discharge or through the inlet port of the treatment tank back into the interior of the treatment tank; and a pump for pumping effluent under pressure from the hollow interior of the treatment tank, through the outlet port of the treatment tank, through the filter component, through the valve, back through the inlet port of the treatment tank back into the interior of the treatment tank many times, and then to discharge.

1 Claim, 3 Drawing Sheets

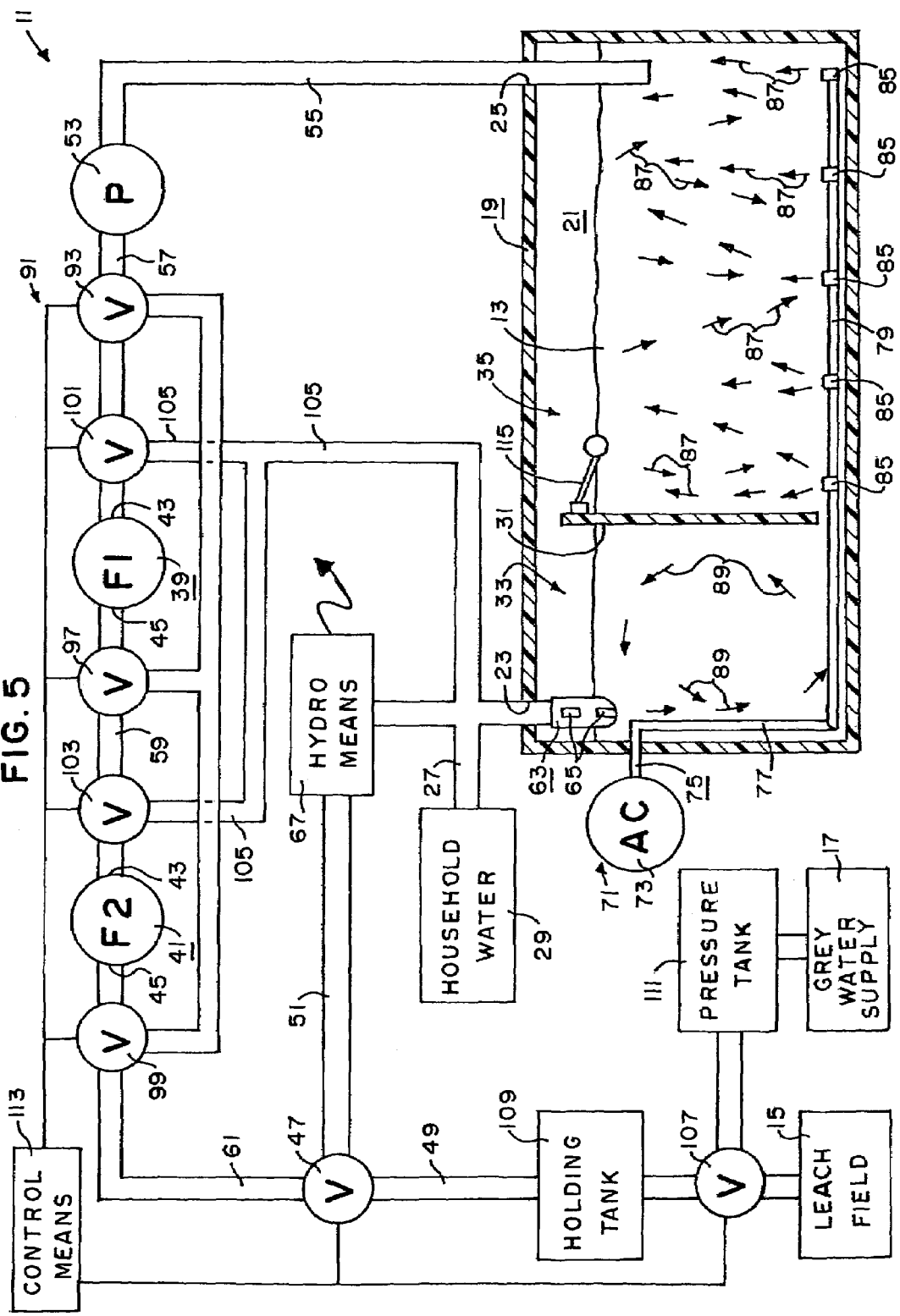

EFFLUENT TREATMENT SYSTEM

BACKGROUND OF THE INVENTION

1. Field of the Invention

The present invention relates, in general, to effluent treatment systems, and in particular, to an effluent treatment system that works based on a septic tank using pressure rather than gravity.

2. Background Art

While complex treatment systems involving chemicals, bacterial action, ultraviolet light, distillation, mechanical and chemical filters, large settling ponds, etc. are used to treat industrial and municipal waste water, the most common domestic waste water treatment system used in rural areas is the septic tank-soil absorption system. In the typical septic tank-soil absorption system, domestic waste water flows by gravity first to a septic tank (also called a holding or settling tank) where settleable and floatable solids is removed from the waste water. In the typical system, the clarified septic tank effluent then flows by gravity to a soil absorption field (also called a leach field) which filters and treats the effluent and distributes the effluent into the soil. In addition to removing solids, the typical septic tank also promotes biological digestion of a portion of the solids and stores an undigested portion (heavier solids called sludge which settles to the bottom of the tank) which must be periodically pumped out of the septic tank for proper disposal.

A preliminary patentability search in Class 210/Subclasses 605, 100 and 108, produced the following patents which appear to be relevant to the present invention:

Elston, U.S. Patent Application No. 2002/0008065, published Jan. 24, 2002, discloses a waste and waste water treatment and recycling system separates black water and grey water at their respective sources and includes a waste separation system for decomposing the black water into water vapor and carbon dioxide gas, a waste water treatment system for circulating, aerating, and separating the grey water into precipitated solid matter and treated water, and a filtration, disinfection, and water recycling system for filtering and disinfecting the treated water to form recyclable water.

Iwahori et al., U.S. Pat. No. 4,824,563, issued Apr. 25, 1989, discloses a method of treating high-concentration organic waste water in dependence upon microorganism in which waste water is first anaerobically treated in an anaerobic operation tank in dependence upon anaerobic bacteria groups and methane bacteria groups; in which waste water is then further aerobically treated repeatedly in an aerobic operation tank, and an organic substance as hydrogen donor is supplied to the aerobic operation tank before the succeeding aerobic treatment; and then the treated water is decolored by ozone treatment.

McIntosh, U.S. Pat. No. 5,106,493, issued Apr. 21, 1992, discloses a grey water reclamation and reuse system for collecting, filtering and storing grey water for reuse where potable quality water is not required.

Humphrey, U.S. Pat. No. 5,114,586, issued May 19, 1992, discloses a sanitation system for treating a black water stream and a grey water stream with the black water stream inputted into a black water digester for being aerobically digested, and with the treated black water and the grey water stream then inputted into a black and grey water digester for being aerobically digested.

Behmann, U.S. Pat. No. 5,254,253, issued Oct. 19, 1993, discloses a modular shipboard membrane bioreactor system for allowing large sea-going vessels to dispose, on-board, liquid waste with a high solids content.

Smith et al., U.S. Pat. No. 5,647,980, issued Jul. 15, 1997, discloses a system for treating waste water from a residential home, comprising a chamber adapted to hold the waste water, a first filter for removing coarse material from the waste water, a second filter for removing fine materials from the waste water, a disinfectant chamber using ultraviolet radiation to disinfect the waste water, and a pump for pumping the waste water from the chamber through the first and second filters and the disinfectant chamber.

Nawathe et al., U.S. Pat. No. 5,647,986, issued Jul. 15, 1997, discloses process for aerobic treatment of waste water including the steps of collecting the waste water in a first tank; aerating the waste water in the first tank to promote aerobic treatment; transferring waste water from the first tank to a second tank; aerating the waste water in the second tank to promote further aerobic treatment; then allowing sludge to settle from the waste water in the second tank; then transferring the clear supernatant liquid from the second tank for dispersal and transferring the sludge from the second tank to the first tank. It is important in this process that no waste water is added to the second tank during the steps of aerating the waste water in the second tank, allowing sludge to settle from the waste water in the second tank, transferring clear supernatant liquid from the second tank, and transferring the sludge from the second tank to the first tank.

Drewery, U.S. Pat. No. 5,667,670, issued Sep. 16, 1997, discloses a system for controlling effluent discharge having an inlet for passing waste water, a filter connected to the inlet for removing solids from the waste water, a filtered water retaining tank connected to the outlet of the filter for accumulating a portion of the water passed from the filter, a filtered water outlet connected to the outlet of the filter to pass filtered water out of the system, and a controller connected to the filtered water retaining tank so as to selectively pass a flow of the accumulated water into the filter.

Berkman, U.S. Pat. No. 6,106,716, issued Aug. 22, 2000, discloses a system for purification of domestic household effluent that uses at least two dual-purpose vessels to treat the effluent so that, under normal use, sludge will have to be pumped from the system for up to ten years.

Elston, U.S. Pat. No. 6,299,775, issued Oct. 9, 2001, and Elston, U.S. Pat. No. 6,383,369, issued May 7, 2002, disclose waste and waste water treatment and recycling systems that separates black water and grey water at their respective sources.

None of these references, either singly or in combination, disclose or suggest the present invention.

BRIEF SUMMARY OF THE INVENTION

The present invention is designed as an effluent system for treating household waste water. The basic concept of the present invention is to provide such an effluent treatment system that uses pressure, rather than gravity, to force effluent through the system.

The effluent treatment system of the present invention includes a treatment tank having a hollow interior for holding a quantity of effluent, an inlet port into the hollow interior, and an outlet port out of the hollow interior; filter means for filtering effluent from the treatment tank; a valve for directing effluent from the filter means to either a discharge or through the inlet port of the treatment tank back into the interior of the treatment tank; and pump means for pumping effluent under pressure from the hollow interior of the treatment tank, through the outlet port of the treatment tank, through the filter means, through the valve, back through the inlet port of the treatment tank back into the interior of the treatment tank, and then to discharge.

One object of the present invention is to provide such a system in which automatic transfer is built into the unit.

Another object of the present invention is to provide such a system in which there is no use of gravity flow from the treatment of the effluent from the tank to filters and back.

Another object of the present invention is to provide such a system in which is included a pressurization unit that allows for the generation of electricity for the system to be self sufficient.

Another object of the present invention is to provide such a system in which co-generation for household use is provided.

Another object of the present invention is to provide such a system in which no additional pumps are required for transfer of effluent or the generation of electricity.

Another object of the present invention is to provide such a system in which there is no dependency on gravity for the treatment of the effluent from one filter to the next or from the unit.

BRIEF DESCRIPTION OF THE SEVERAL VIEWS OF THE DRAWINGS

FIG. 5 is a somewhat diagrammatic view of the effluent treatment system of the present invention similar to FIG. 1 but showing the basic backwash flow components and computer control components thereof.

DETAILED DESCRIPTION OF THE INVENTION

Figure 1:
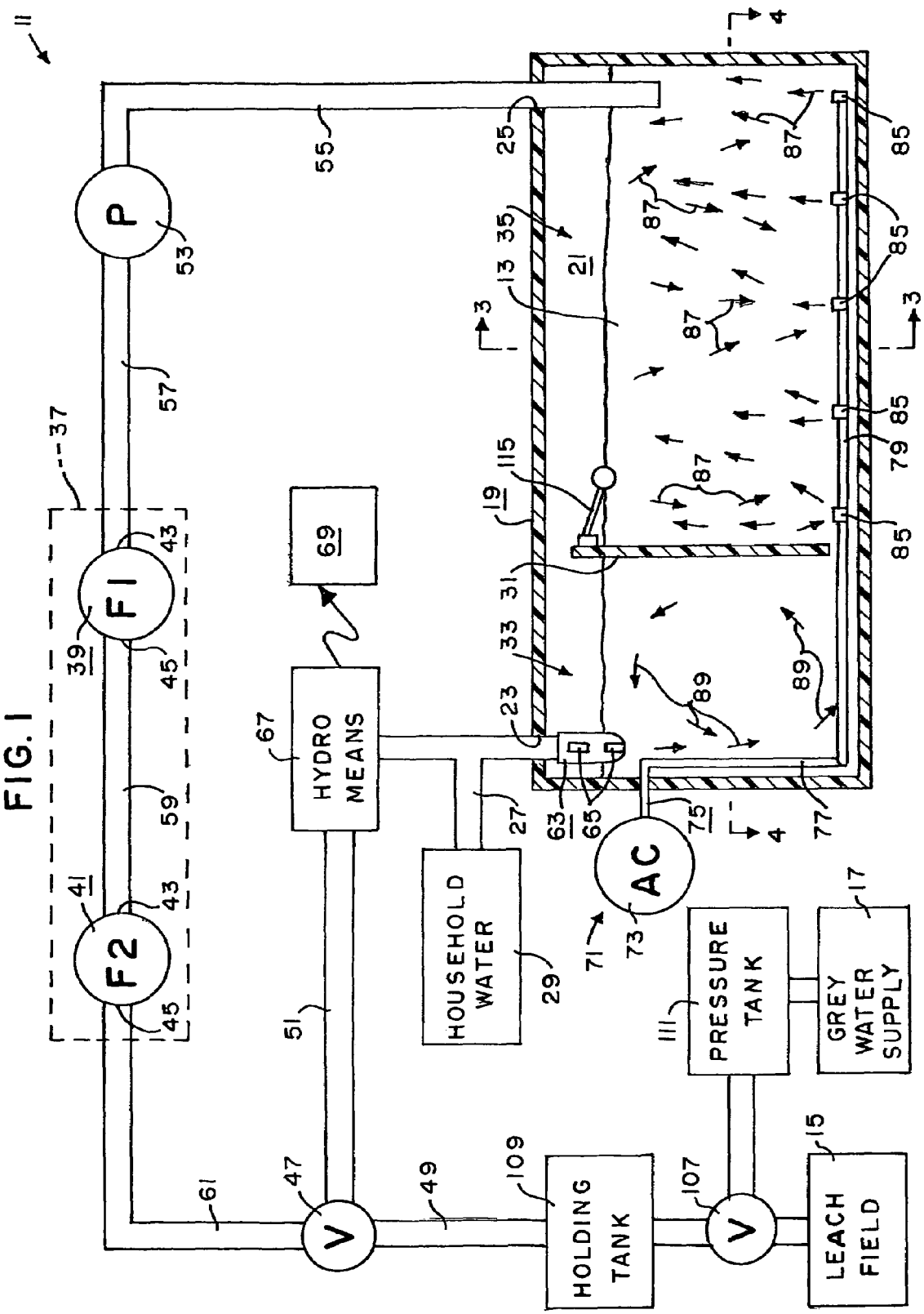
FIG. 1 is a somewhat diagrammatic view of the basic filtration flow components of the effluent treatment system of the present invention.

The preferred embodiment of the effluent treatment system of the present invention is shown in FIGS. 1–5 and identified by the numeral 11. The system 11 is designed to treat effluent 13, i.e., household sewage or other liquid waste that is to be treated and either discharged to a leach field 15, etc., or used as a grey water supply 17. Grey water is waste water, typically collected from clothes washers, bathtubs, showers, and laundry or bathroom sinks, that is considered safe for landscape irrigation and the like.

The system 11 includes a treatment tank 19, such as a typical septic tank, having a hollow interior 21 for holding a quantity of effluent 13, an inlet port 23 into the hollow interior 21, and an outlet port 25 out of the hollow interior 21. The treatment tank 19 may be, for typical household use, a 1050 gallon, NuConSept polyethylene septic tank manufactured by Synder Industries, Inc. of 4700 Fremont Street, Lincoln, Nebr. 68504, part number 50600155. The tank 19 is intended to be installed below ground in the typical manner with a household waste water line 27 coupled to the inlet port 23 of the tank 19 in a manner that allows household waste water 29 to flow, typically by gravity, to the inlet port 23 and into the interior 21 of the tank 19 as will now be apparent to those skilled in the art. The interior 21 of the tank 19 is preferably divided by a partial wall or baffle 31 into an anaerobic first zone or chamber 33 and an aerobic second zone or chamber 35.

The system 11 includes filter means 37 for filtering effluent from the treatment tank 19. The filter means 37 preferably includes a first filter 39 and a second filter 41 arranged in series with one another so that effluent from the treatment tank 19 will first pass through the first filter 39 and then pass through the second filter 41. The first filter 39 preferably includes 40 gallons or 4.6 cubic feet of activated charcoal. The second filter preferably includes 40 gallons or 4.6 cubic feet of sand. The filters 39, 41 may consist of typical canister-type filters having an upper inlet port 43 and a lower outlet port 45.

The system 11 includes valve 47 for directing effluent from the filter means 37 to either a discharge line 49 for discharge either to the leach field 15 or the grey water supply 17, or a recycle line 51 for being redirected back through the inlet port 23 of the treatment tank 19 back into the interior 21 of the treatment tank 19 for further treatment. A basic concept and feature of the present invention is that the effluent will be continuously redirected through the recycle line 51, and back through the treatment tank 19 and filter means 37, before final discharge through the discharge line 49. The valve 47 may be any typically, electrically control, two-way valve well know to those skilled in the art, designed to handle the quantity of fluid to be handled by the system 11.

The effluent treatment system 11 includes pump means 53 for pumping effluent 13 under pressure from the interior 21 of the treatment tank 19 through a pump intake line 55 coupled to the outlet port 25 of the treatment tank 19, then to the filter means 37 via a line 57, then through the filter means 37 (e.g., through the first filter 39, through a line 59, and then through the second filter 41), then to the valve 47 through a line 61, and then through the valve 47 for passage either through the discharge line 49 to the leach field 15 or grey water supply 17, or through the recycle line 51 back into the treatment tank 19. A basic concept and feature of the present invention is that pump means 53 will continuously pump effluent 13 under pressure from the treatment tank 19 through the filter means 37, back through the recycle line 51 into the treatment tank 19 before final discharge through the discharge line 49. The pump means 53 is preferably a high volume liquid pump such as a PacFab CHALLENGER I high pressure recirculating pump (Pentair, Inc., 5500 Wayzata Boulevard, Golden Valley, Minn. 55416-1261) for putting the effluent 13 under pressure (preferably 40 to 45 pounds per square inch at the rate of 60 gallons per minute) as the effluent 13 is drawn from the treatment tank 19.

Figure 2:
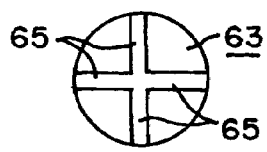
FIG. 2 is a end view of the intake nozzle of the effluent treatment system of the present invention.
Figure 3:
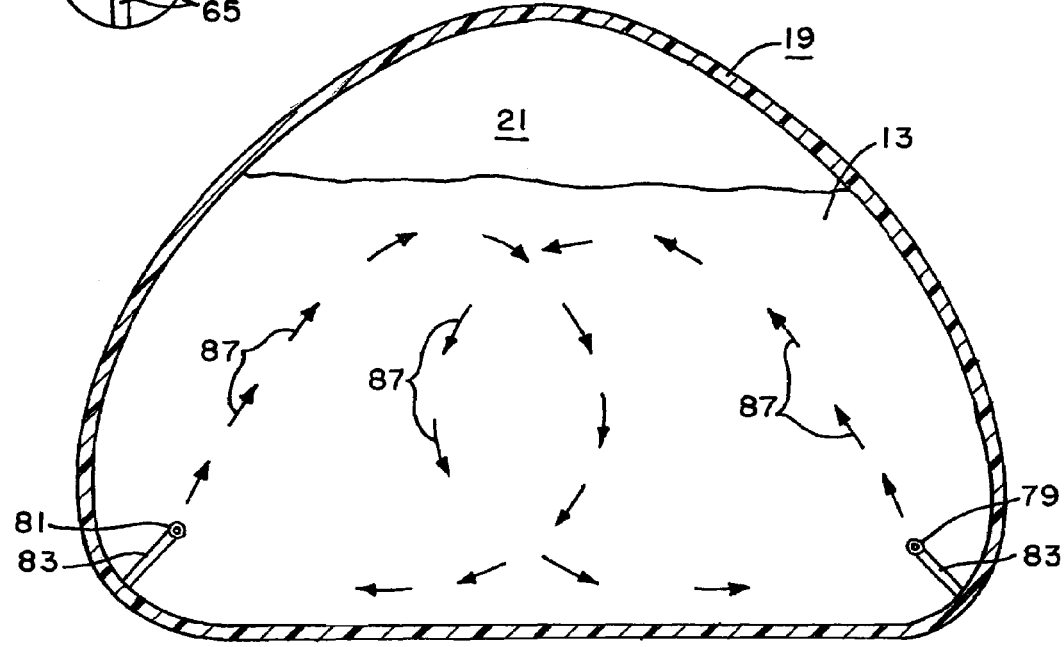
FIG. 3 is a sectional view substantially as taken on line 3—3 of FIG. 1.
Figure 4:
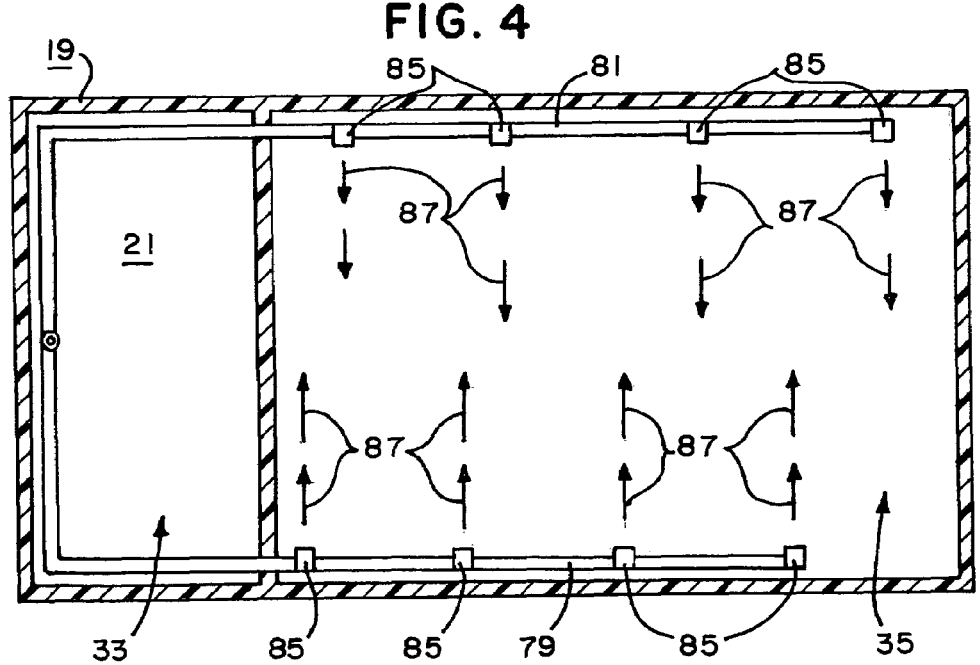
FIG. 4 is a sectional view substantially as taken on line 4—4 of FIG. 1.

The inlet port 23 of the treatment tank 19 preferably has a discharge nozzle 63 designed to break or tear apart solid waste entering the interior 21 of the treatment tank 19 through the inlet port 23. The nozzle 63 may be substantially closed except for slots 65 in the lower sides and/or end thereof. The nozzle 63 preferably has two slots 65 at right angles to one another in the lower end thereof as shown in FIG. 2.

Due to the fact that the system 11 is a pressurized filtering unit, the system 11 preferably includes a hydro-electrical generating system or means (i.e., a hydro means) 67 for generating electricity from the effluent, being pumped under pressure through the inlet port 23 of the treatment tank 19 back into the interior 21 of the treatment tank 19 many times. The hydro means 67 may be installed between the pump means 53 and the inlet port 23, preferably in the recycle line 51 between the valve 47 and the inlet port 23 as shown in FIG. 1. The actual hydro means 67 used depends on the size of the system 11, etc. Preferably, for a typical household, the hydro means 67 is a Canyon Hydro system using either a Pelton or Francis turbine, etc. manufactured by Canyon Industries, Inc., 5500 Blue Heron Lane, Deming, Wash. 98244. The hydro means 67 will produce electricity for storage in direct current batteries 69 or the like. If alternating current electricity is needed, an invertor (not shown) may be provided to change the direct current electricity stored in the batteries 69 to alternating current electricity. The amount of electricity stored or to be used can be pro-rated and the quantity of batteries 69 needed can be determined. The size of the hydro means 67 can be adjusted to meet the demand, etc. As the pump 53 is never shut down under normal use, the system 11 will produce electricity via the hydro means 67 on a continual basis.

The system 11 preferably includes an aeration means 71 for causing aeration of the effluent 13 within the treatment tank 19. The aeration means 71 includes an air pump 73, and an air distribution means 75 for distributing air from the air pump 73 within the interior 21 of the treatment tank 19. The air distribution means 75 is designed to cause specific movement of the air and effluent 13 within the interior 21 of the treatment tank 19.

The air pump 73 may consist of any typical compressor-type air pump, such as the Dayton Speedair model 2Z866 compressor/vacuum pump manufactured by Dayton Electric Manufacturing Company, Chicago, Ill. 60648. The air distribution means 75 is preferably constructed of 0.5 inch (12.7 millimeters) diameter polyvinyl chloride (PVC) piping or the line, with a first pipe 77 leading from the output of the air pump 73 to the first zone 33 within the interior 21 of the treatment tank 19 and a manifold splitting into parallel, spaced apart second and third pipes 79, 81 which extend along the bottom sides of the second zone 35 of the interior 21 of the treatment tank 19 as clearly shown in FIGS. 3 and 4. Brackets 83 may be provided to support the pipes 79, 81, etc. (see FIG. 3). The second and third pipes 79, 81 have a plurality of air outlet ports or nozzles 85 precisely arranged within the second zone 35 of the interior 21 of the treatment tank 19 for allowing and causing air to be discharged within the second zone 35 of the interior 21 of the treatment tank 19 and causing the effluent 13 to move within the second zone 35 of the interior 21 of the treatment tank 19 in the direction and pattern indicated by the arrows 87 in FIGS. 1, 3, 4 and 5.

The combination of the household water 29 being fed by gravity through the inlet port 23 into the first zone 33 of the interior 21 of the treatment tank 19, recycled effluent 13 being forced by pressure through the inlet port 23 into the first zone 33 of the interior 21 of the treatment tank 19, etc., the effluent 13 will move within the first zone 33 of the interior 21 of the treatment tank 19 in the direction and pattern indicated by the arrows 89 in FIGS. 1 and 5. Due to the pressure of the recycled effluent 13 at the inlet port 23, the specific design of the discharge nozzle 63, etc., any solids in the effluent 13 ares broken apart at the beginning of the precess, and the anaerobic process is started with the waste being separated by water pressure. Due to the breakdown of the effluent 13, anaerobic bacteria multiply and destroy the solids at a fast rate. Suction from the outlet port 25 caused by the pump means 53 will pull the effluent 13 under the baffle 31 and into the aerobic, second zone 35 of the system. Oxygen is fed into the aeration section (i.e., the second zone 35) via the air distribution means 75, at a sufficient rate to start and keep the aerobic microbes alive.

The system 11 preferably incudes back flush means 91 for back flushing the filter means 37. The back flush means 91 is shown diagrammatically in FIG. 5, and may include a valve 93 in the line 57 between the pump means 53 and the first filter 39 for movement between a first position in which effluent 13 from the pump means 53 is caused to flow to the inlet port 43 of the first filter 39, and a second position in which effluent 13 from the pump means 53 is caused to flow through a line 95 to the outlet ports 45 of the first and second filters 39, 41. As shown in FIG. 5, the back flush means 53 includes a valve 97 between the line 59 and the line 95 for movement between a first position in which effluent 13 from the outlet port 45 of the first filter 39 is caused to flow through line 59 to the inlet port 43 of the second filter 41, and a second position in which effluent 13 from the line 95 is caused to flow under pressure into the outlet port 45 of the first filter 39, through the first filter 39, and out the inlet port 43 of the first filter 39, thereby back washing the first filter 39 and causing all collected waste from the first filter 39 to be discharged back through the inlet port 43 thereof for return back to the treatment tank 19 for further processing as will hereinafter become apparent.

Also, as shown in FIG. 5, the back flush means 53 includes a valve 99 between the line 61 and the line 95 for movement between a first position in which effluent 13 from the outlet port 45 of the second filter 41 is caused to flow through line 61 to the valve 47, and a second position in which effluent 13 from the line 95 is caused to flow under pressure into the outlet port 45 of the second filter 41, through the second filter 41, and out the inlet port 43 of the second filter 41, thereby back washing the second filter 41 and causing all collected waste from the second filter 41 to be discharged back through the inlet port 43 thereof for return back to the treatment tank 19 for further processing as will hereinafter become apparent.

Also, as shown in FIG. 5, the back flush means 53 includes a valve 101 in the line 57 between the first filter 39 and the valve 93, a valve 103 in the line 59 between the second filter 41 and the valve 97, and a bifurcated line 105 extending between the valves 101, 103 and the inlet port 23 of the treatment tank 19. The valve 101 has a first position in which effluent 13 is allowed to flow from the valve 93 to the first filter 39, and a second position in which effluent 13 from the inlet port 43 of the first filter 39 is allowed to back flow under pressure through the line 105 to the inlet port 23 of the treatment tank 19, thereby back washing the first filter 39 and causing all collected waste from the first filter 39 to be discharged back into the treatment tank 19 for further processing. The valve 103 has a first position in which effluent 13 is allowed to flow from the valve 97 to the second filter 41, and a second position in which effluent 13 from the inlet port 43 of the second filter 41 is allowed to back flow under pressure through the line 105 to the inlet port 23 of the treatment tank 19, thereby back washing the second filter 41 and causing all collected waste from the second filter 41 to be discharged back into the treatment tank 19 for further processing.

The system 11 may include valve 107 in the discharge line 49 having a first position in which treated effluent is caused to flow to the leach field 15 and a second position in which treated effluent is caused to flow to the grey water supply 17. The system 11 may include a holding tank 109 for holding treated water passing from the valve 47 through the discharge line 49, and a pressure tank 111 between the valve 107 and the grey water supply 17.

The various valves 47, 93, 97, 99, 101, 103, 107 may be common solenoid controlled, two-way valves or the like well know to those skilled in the art, and the system 11 may include control means 113 for controlling the various valves 47, 93, 97, 99, 101, 103, 107, etc. The control means 113 may include a computer for allowing the various valves 47, 93, 97, 99, 101, 103, 107 to be controlled by a computer program. On the other hand, the control means 113 may include a first simple timer for causing the valves 93, 97, 99, 101, 103 of the back flush means 91 to move to the second positions to back flush the filters 39, 41 every 72 hours or the like, and a second simple timer for causing the valve 47 to direct effluent from the filter means 37 to the recycle line 51 for being redirected back through the inlet port 23 of the treatment tank 19 back into the interior 21 of the treatment tank 19 for further aeration and treatment thousands of times (e.g., approximately 53,000 times). Still, on the other hand, the control means 113 could merely include manual switches to allow an operator to manually activate the pump means 53, air pump 73, control the various valves 47, 93, 97, 99, 101, 103, 107, etc. The system 11 may include a mercury float switch 115 or the like within the interior 21 of the treatment tank 19 for being closed with the level of effluent 13 within the interior 21 of the treatment tank 19 reaches a certain level, and an electric alarm or the like (not shown) for giving an alarm if the system 11 malfunctions, overfills, etc. Chlorine and the like may be added to the treated water prior to the holding tank 109, etc.

As thus constructed and used, the system 11 of the present invention is under constant pressure and there is no dead zone due to the input of recycled water end of the treatment tank, the suction from opposite end of the treatment tank, and the air distribution, causing waste to be broken up and pulled through the treatment tank. Aerobic bacterial will feed and multiply at a rapid rate, and the regular back wash of the filters cleans larger particles from the filter media and place such particles back in the treatment tank for further treatment.

Although the present invention has been described and illustrated with respect to a preferred embodiment and a preferred use therefor, it is not to be so limited since modifications and changes can be made therein which are within the full intended scope of the invention.

The invention claimed is:

1. An effluent treatment system, said system comprising:
 (a) a treatment tank having a hollow interior for holding a quantity of effluent, an inlet port leading into said hollow interior, and an outlet port leading out of said hollow interior;
 (b) filter means for filtering effluent from said treatment tank;
 (c) a valve for directing effluent from said filter means to either a discharge or through said inlet port of said treatment tank back into said interior of said treatment tank;
 (d) pump means for pumping effluent under pressure from said hollow interior of said treatment tank, through said outlet port of said treatment tank, through said filter means, through said valve, back through said inlet port of said treatment tank back into said interior of said treatment tank, and then to discharge; and
 (e) hydro-electrical generating means for generating electricity from the effluent being pumped under pressure through said inlet port of said treatment tank back into said interior of said treatment tank many times.

* * * * *